(12) United States Patent
Bai (10) Patent No.: US 10,404,657 B2
(45) Date of Patent: Sep. 3, 2019

(54) METHOD AND DEVICE FOR ACCESSING WEBSITE

(71) Applicant: Baidu Online Network Technology (Beijing) Co., Ltd, Beijing (CN)

(72) Inventor: Yu Bai, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 158 days.

(21) Appl. No.: 15/547,558

(22) PCT Filed: Jul. 3, 2017

(86) PCT No.: PCT/CN2017/091455
§ 371 (c)(1),
(2) Date: Jul. 31, 2017

(87) PCT Pub. No.: WO2018/028346
PCT Pub. Date: Feb. 15, 2018

(65) Prior Publication Data
US 2018/0343232 A1 Nov. 29, 2018

(30) Foreign Application Priority Data
Aug. 11, 2016 (CN) .......................... 2016 1 0659112

(51) Int. Cl.
*G06F 13/00* (2006.01)
*H04L 29/12* (2006.01)
(Continued)

(52) U.S. Cl.
CPC ...... *H04L 61/2592* (2013.01); *H04L 12/4633* (2013.01); *H04L 29/08* (2013.01); *H04L 67/02* (2013.01); *H04L 61/1511* (2013.01)

(58) Field of Classification Search
CPC ..... H04L 12/4633; H04L 29/08; H04L 67/02; H04L 61/2592; H04L 61/1511
(Continued)

(56) References Cited

U.S. PATENT DOCUMENTS 6,665,702 B1 * 12/2003 Zisapel ................... G06F 9/505
709/223
8,266,319 B2 * 9/2012 Zisapel ................... G06F 9/505
709/238
(Continued)

FOREIGN PATENT DOCUMENTS

| CN | 102394944 A | 3/2012 |
| CN | 102932473 A | 2/2013 |

(Continued)

OTHER PUBLICATIONS

International Search Report in International Patent Application No. PCT/CN2017/091455, dated Sep. 30, 2017 (3 pages, w/English Translation).

(Continued)

*Primary Examiner* — Kenneth R Coulter
(74) *Attorney, Agent, or Firm* — Nixon Peabody LLP (57) ABSTRACT

A method and an apparatus for accessing a website. A specific implementation of the method includes: receiving an access request for the website, the access request comprising a source network address of the access request and a network address of the website; detecting whether the source network address and the network address of the website belong to a same Internet service provider; determining a target inter-network node from a preset inter-network node set in response to detecting the source network address and the network address of the website not belonging to the same Internet service provider, the target inter-network node being an inter-network node connecting a network of an Internet service provider to which the source (Continued)

network address belongs and a network of an Internet service provider to which the network address of the website belongs; and transmitting the access request to the target inter-network node. This implementation improves the speed for accessing a website.

18 Claims, 5 Drawing Sheets

(51) Int. Cl.
  *H04L 29/08* (2006.01)
  *H04L 12/46* (2006.01)
(58) Field of Classification Search
  USPC ........ 709/245, 230–235, 227, 229, 217–219, 709/224
  See application file for complete search history.

(56) References Cited

U.S. PATENT DOCUMENTS

| | | | | |
|---|---|---|---|---|
| 8,484,374 | B2* | 7/2013 | Zisapel | G06F 9/505 709/238 |
| 9,912,631 | B2* | 3/2018 | Bergman | H04L 61/2007 |
| 9,917,774 | B2* | 3/2018 | Chopra | H04L 12/4633 |
| 10,097,503 | B2* | 10/2018 | Bergman | H04L 67/2842 |
| 2003/0195984 | A1* | 10/2003 | Zisapel | G06F 9/505 709/238 |
| 2015/0095516 | A1* | 4/2015 | Bergman | H04L 67/2842 709/245 |
| 2015/0127721 | A1* | 5/2015 | Bergman | H04L 43/0888 709/203 |
| 2015/0188881 | A1* | 7/2015 | Bergman | H04L 61/2007 709/218 |
| 2017/0093712 | A1* | 3/2017 | Chopra | H04L 12/4633 |

FOREIGN PATENT DOCUMENTS

| | | |
|---|---|---|
| CN | 103067307 A | 4/2013 |
| WO | WO 2007/124771 | 11/2007 |

OTHER PUBLICATIONS

Written Opinion in International Patent Application No. PCT/CN2017/091455, dated Sep. 30, 2017 (3 pages, w/English Translation).

* cited by examiner

METHOD AND DEVICE FOR ACCESSING WEBSITE

CROSS-REFERENCE TO RELATED APPLICATION

This application is a U.S. National Stage of International Application No. PCT/CN2017/091455, filed Jul. 3, 2017, which is related to and claims the benefit and priority of Chinese Patent Application No. 201610659112.7 filed on Aug. 11, 2016, the contents of which are incorporated herein in their entireties by reference.

TECHNICAL FIELD

The present disclosure relates to the field of computer technology, specifically to the field of Internet technology, and more particularly, to a method and an apparatus for accessing a website.

BACKGROUND

Domestic networks include a plurality of Internet Service Providers (ISPs), and most websites are only deployed in single-line captive offices(for example, China Unicom captive office or China Telecom captive office). Therefore, when users browse websites, access speed may be affected by large network delays when access path traverses the ISPs.

Some websites may use a Content Delivery Network (CDN) for acceleration. However, nodes of CDN providers are generally also single-line, which may result in CDN nodes accessing websites to cross ISPs, thereby effecting the access speed.

Traditional CDN systems only use nodes that are closest to the users to provide services, and paths for accessing the websites by the users cannot be adjusted, or flexibly adjusted. Therefore, a problem of decreased access speed may occur when accessing other ISPs.

SUMMARY

An objective of the present application is to provide a method and apparatus for accessing a website, in order to solve the technical problem mentioned in the foregoing Background section.

In a first aspect, the present disclosure provides a method for accessing a website, which comprises: receiving an access request for the website, wherein the access request comprises a source network address of the access request and a network address of the website; detecting whether the source network address and the network address of the website belong to a same Internet service provider; determining a target inter-network node from a preset inter-network node set in response to detecting the source network address and the network address of the website not belonging to the same Internet service provider, wherein the target inter-network node is an inter-network node connecting a network of an Internet service provider to which the source network address belongs and a network of an Internet service provider to which the network address of the website belongs; and transmitting the access request to the target inter-network node.

In some embodiments, the determining a target inter-network node from a preset inter-network node set comprises: selecting, from the preset inter-network node set, inter-network nodes connecting the network of the Internet service provider to which the source network address belongs and the network of the Internet service provider to which the network address of the website belongs, to compose a candidate target inter-network node set; acquiring a log of each candidate target inter-network node in the candidate target inter-network node set; calculating an access speed of accessing the website via the each candidate target inter-network node by means of data traffic information recorded in the acquired log; and selecting a predetermined number of candidate target inter-network nodes as the target inter-network nodes according to an order of the access speed from high to low.

In some embodiments, before transmitting the access request to the target inter-network node, the method further comprises: adding a counter into an HTTP header of the access request, wherein an initial value of the counter is associated with the number of nodes through which the access request will pass, and a value of the counter decreases progressively every time one node is passed.

In some embodiments, the transmitting the access request to the target inter-network node comprises: transmitting the access request to the target inter-network node through Dedicated Internet Access.

In some embodiments, the transmitting the access request to the target inter-network node comprises: transmitting the access request to the target inter-network node through IP tunneling which is a protocol for interconnecting networks.

In some embodiments, the preset inter-network node is a Border Gateway Protocol node.

In some embodiments, the preset inter-network node is a dual-line node of an Internet service provider.

In a second aspect, the present disclosure provides an apparatus for accessing a website, which comprises: a receiving unit, configured to receive an access request for the website, wherein the access request comprises a source network address of the access request and a network address of the website; a detecting unit, configured to detect whether the source network address and the network address of the website belong to a same Internet service provider; a selecting unit, configured to determine a target inter-network node from a preset inter-network node set in response to detecting the source network address and the network address of the website not belonging to the same Internet service provider, wherein the target inter-network node is an inter-network node connecting a network of an Internet service provider to which the source network address belongs and a network of an Internet service provider to which the network address of the website belongs; and a transmitting unit, configured to transmit the access request to the target inter-network node.

In some embodiments, the selecting unit is further configured to: select, from the preset inter-network node set, inter-network nodes connecting the network of the Internet service provider to which the source network address belongs and the network of the Internet service provider to which the network address of the website belongs, to compose a candidate target inter-network node set; acquire a log of each candidate target inter-network node in the candidate target inter-network node set; calculate an access speed of accessing the website via the each candidate target inter-network node by means of data traffic information recorded in the acquired log; and select a predetermined number of candidate target inter-network nodes as the target inter-network nodes according to an order of the access speed from high to low.

In some embodiments, the apparatus further comprises: a counting unit, configured to add a counter into an HTTP header of the access request before transmitting the access request to the target inter-network node, wherein an initial value of the counter is associated with the number of nodes through which the access request will pass, and a value of the counter decreases progressively every time one node is passed.

In some embodiments, the transmitting unit is further configured to transmit the access request to the target inter-network node through Dedicated Internet Access.

In some embodiments, the transmitting unit is further configured to transmit the access request to the target inter-network node through IP tunneling which is a protocol for interconnecting networks.

In some embodiments, the preset inter-network node is a Border Gateway Protocol node.

In some embodiments, the preset inter-network node is a dual-line node of an Internet service provider.

The method and apparatus for accessing a website provided in the present disclosure can increase a inter-network access speed by increasing CDN nodes across ISP networks, and can dynamically select an access path, thereby solving a problem of being slow in accessing cross ISP networks.

BRIEF DESCRIPTION OF THE DRAWINGS

Other features, objectives and advantages of the present application will become more apparent upon reading the detailed description to non-limiting embodiments with reference to the accompanying drawings.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
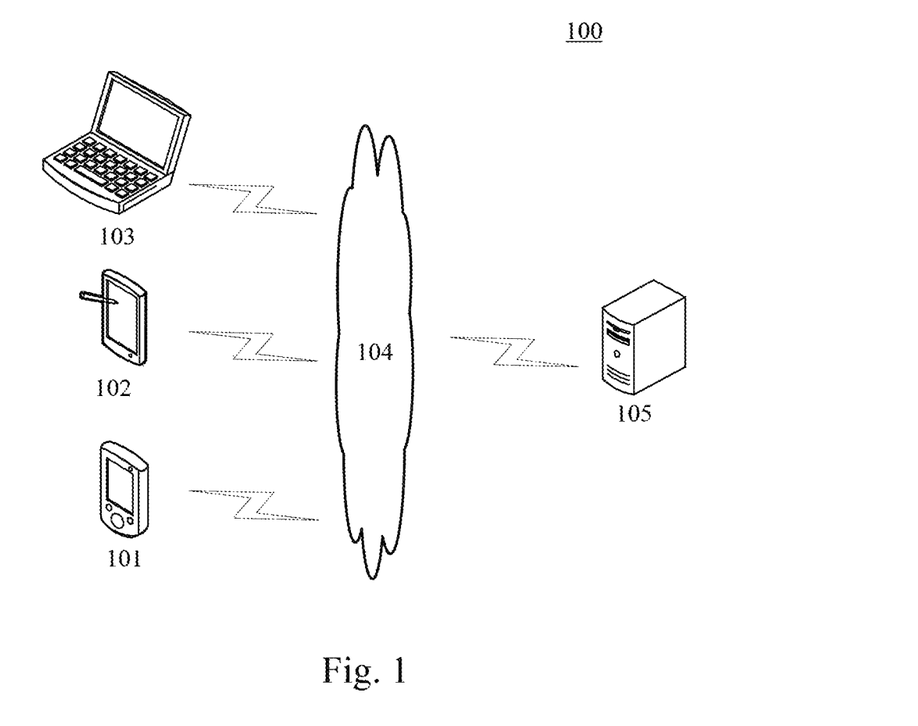
FIG. 1 is an architectural diagram of an exemplary system in which the present application may be implemented.

FIG. 1 shows an exemplary architecture of a system 100 applicable to the method or apparatus for accessing a website according to the embodiments of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as webpage browser applications, shopping applications, search applications, instant messaging tools, mailbox clients, and social platform software may be installed on the terminal devices 101, 102 and 103.

The terminal devices 101, 102 and 103 may be various electronic devices having a display screen and supporting network applications, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a CDN node server for speeding up the access to a website by using the terminal devices 101, 102 and 103. The CDN node server may analyze or process the received access request for a source website and other data, and then may direct in real time the access request for the source website from a user to a nearest service node from the user, according to the network traffic, the connection and load of nodes, the distance and response time to the user, and/or any other information.

It should be noted that the method for detecting an access path according to the embodiments of the present application is generally executed by the server 105. Accordingly, the apparatus for detecting an access path is generally installed on the server 105.

It is to be understood that the number of the terminal devices, the networks and the servers in FIG. 1 is merely exemplary. Any number of the terminal devices, the networks and the servers may be provided as required.

Figure 2:
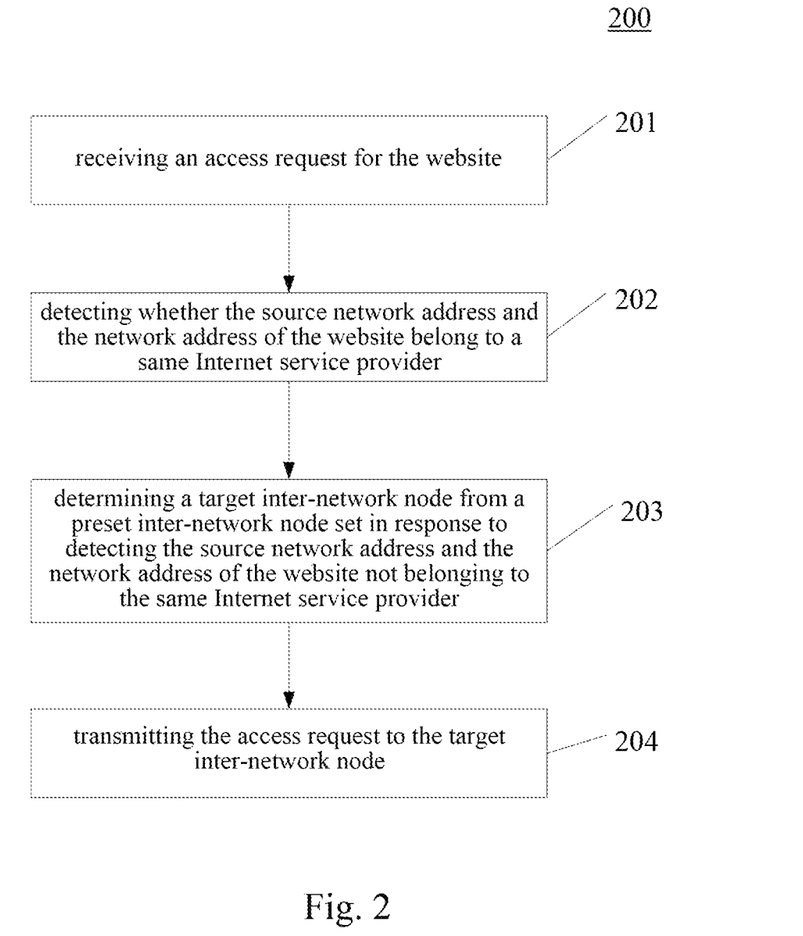
FIG. 2 is a schematic flowchart of a method for accessing a website according to an embodiment of the present application.

Referring to FIG. 2, a flowchart 200 of a method for accessing a website according to an embodiment of the present disclosure is illustrated. The method for accessing a website comprises following steps.

Step 201: receiving an access request for the website.

In this embodiment, an electronic device (for example, a server as shown in FIG. 1) on which the method for accessing a website runs may receive an access request for the website from a terminal used by a user for website access by way of wired connection or wireless connection. The access request comprises a source network address of the access request and a network address of the website. For example, the source network address when the user uses a network terminal to initiate an access request is 202.111.111.111, the user enters a domain name of a website to be accessed in a browser of the user, and the browser first checks whether there is an IP (Internet Protocol) value corresponding to the domain name. The browser directly uses the IP to access the website when there is the IP corresponding to the domain name. The browser requests to resolve the domain name from a local DNS (Domain Name System) server when there is no IP address corresponding to the domain name. The local DNS server is a DNS allocated by a local ISP. The local DNS server searches for an authorized DNS record from a root DNS server, and the record is returned to the local DNS server. After a domain name resolution request is transmitted to a CDN server, the server transmits an IP of a node to which the domain name responds the most quickly to the local DNS server so that the local DNS server transmits the IP to the user. After obtaining the IP address, the user issues an access request to a CDN node. A plurality of preset paths are selected as candidate paths to acquire data from the website according to the address of the website when the CDN node having received the access request does not cache responded content or the cache has expired.

Step 202: detecting whether the source network address and the network address of the website belong to the same Internet service provider.

In this embodiment, it is detected whether the source network address and the network address of the website belong to the same Internet service provider (ISP). Each ISP has a network segment of its own. When an IP address is within a network segment range of an ISP, the IP address belongs to the ISP. Through the IP address, it may be differentiated that whether the source network address of the access request and the network address of the website belong to the network segment range of the same ISP. Step 203 is executed when the source network address of the access request and the network address of the website do not belong to the network segment range of the same ISP.

Step 203: determining the target inter-network node from the preset inter-network node set in response to detecting the source network address of the access request and the network address of the website not belonging to the same ISP.

In this embodiment, it is determined whether to select an inter-network node based on the detection result in Step 202. The target inter-network node is an inter-network node connecting the network of the Internet service provider to which the source network address belongs and the network of the Internet service provider to which the network address of the website belongs. Inter-network is required when the source network address and the network address of the website do not belong to the same ISP. At this moment, a node connecting the two different ISPs is selected from the preset inter-network node set. The node may also connect other ISPs. A inter-network node may be selected, and other inter-network nodes or same-network nodes may also be selected. The access path may be extended to be multilevel.

In some optional implementations of this embodiment, the preset inter-network node is a Border Gateway Protocol node. That is, a border gateway protocol (BGP) room. The BGP room adopts a BGP scheme to implement dual-line interconnection or multiline interconnection. The server only needs to set up an IP address. The optimal access routing is determined by a backbone router on the network according to routing hops and other technical indicators, and no system resource of the server may be occupied. Both upstream routing and downstream routing of the server may select the optimal path. Therefore, high-speed access to a single IP maybe really implemented. The BGP protocol itself is characterized by redundant backup and cancellation loop. Therefore, mutual backup of routing may be implemented when an ISP has a plurality of BGP interconnection lines, and the routing may be automatically switched to other lines when one line goes wrong. Using the BGP protocol also may endow the network with strong scalability, which may interconnect an Internet Data Center (IDC) network with other operators, so that a single-IP multi-line scheme may be easily implemented, ensuring user access to all ISPs to be quick. This is incomparable to a dual-IP dual-line scheme.

In some optional implementations of this embodiment, the preset inter-network node is a dual-line node of an Internet service provider. The ISP dual-line node is a node that may access different ISP services to one server or server cluster by using special technological means in an Internet Data Center, so that network services provided by the server can access a user with the same ISP or an ISP connection having a higher mutual access speed as much as possible, thereby solving or alleviating a problem of being slow or delayed (North-South network bottlenecks) in accessing a website for a cross-ISP user.

Step 204: transmitting the access request to the target inter-network node.

In this embodiment, the cross-ISP access request needs to be transmitted to the website by means of the target inter-network node selected in Step 203. After the inter-network node receives the access request, the access request maybe directly sent to the website or maybe transmitted to the website by means of other inter-network nodes or same-network nodes.

In some optional implementations of this embodiment, a counter is added into a hypertext transfer protocol (HTTP) header of the access request, wherein an initial value of the counter is associated with the number of nodes through which the access request will pass, and a value of the counter decreases progressively every time one node is passed. For example, in Step 202 one inter-network node and one same-network node are selected to serve as nodes that will pass later, the initial value of the counter may be set to two, and one is subtracted from the value of the counter every time one node passes. When the value of the counter is zero, the node may discard the access request when the access request still reaches a certain node. In such a case, the initial value of the counter may be set to four, and two is subtracted from the value of the counter every time one node passes. When the value of the counter is zero, the node may discard the access request when the access request still reaches a certain node. The initial value of the counter is associated with the number of nodes through which the access request will pass, so that looped access caused by a program error may be prevented, that is, infinite mutual transmission between CDN nodes may be prevented.

In some optional implementations of this embodiment, the access request is transmitted to the target inter-network node through Dedicated Internet Access. Dedicated Internet Access service refers to a convenient and efficient high-speed Internet access service implemented by directly connecting dedicated links providing various rates for clients (mainly providing transmission rate of 2 M and above 2 M) with IP backbone networks. The Dedicated Internet Access service may provide dedicated access of higher rate according to client requirements, mainly including: 2 Mb/s, 10 Mb/s, 100 Mb/s, 1000 Mb/s, etc. Compared with common Internet access, the Dedicated Internet Access service is characterized in that the clients may access the Internet via relatively permanent communication lines. A biggest difference from dial-up networking is that a permanent, high-speed and stable connection is maintained between a dedicated line and the Internet, so that clients can implement 24-hour Internet access to acquire global information resources at any moment, thereby enhancing a business transaction efficiency. A dedicated line client has a fixed and real IP address, and thus can relatively conveniently provide information services for other clients on the Internet. The dedicated line is characterized by low bit error rate and small time delay. The whole circuit resource of a proprietary bandwidth only serves for one client, and thus the entire bandwidth is completely exclusive to the client.

In some optional implementations of this embodiment, the access request is transmitted to the target inter-network node through IP tunneling which is a protocol for interconnecting networks. The IP tunneling is a processing procedure in which a router packages a network layer protocol into another protocol to transmit the packaged protocol to another router across the network. This manner can allow network services from a plurality of information sources to be transmitted in the same infrastructure via different tunnels. The IP tunneling uses a point-to-point communication protocol to replace a switch connection, and connects a data address via a routing network. The IP tunneling allows an authorized mobile user or an authorized user to access an enterprise network at any time and any place. Establishing a tunnel may forcibly transmit data flow to a particular address, hide a private network address, transmit a non-IP packet via an IP network, and provide data security support.

Figure 3:
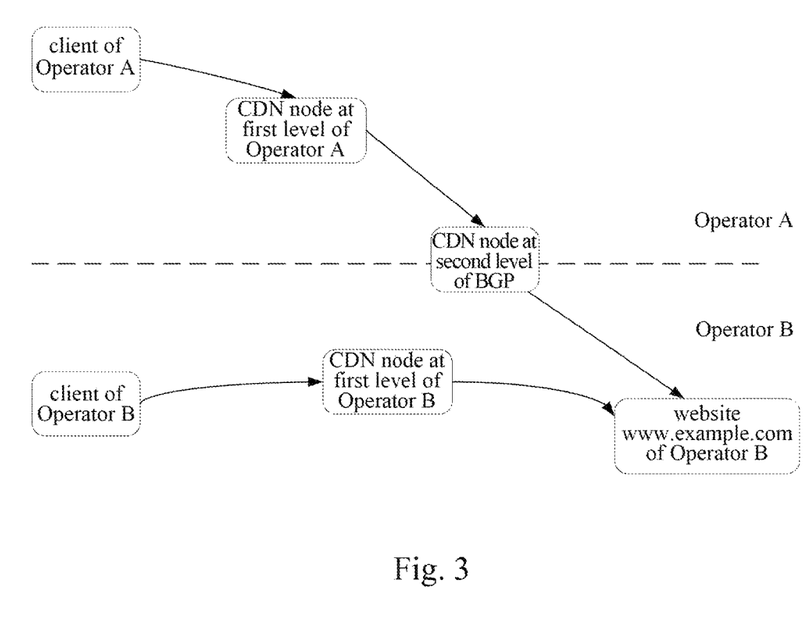
FIG. 3 is a schematic diagram of an application scenario of the method for accessing a website according to the present application.

Continuing referring to FIG. 3, a schematic diagram of an application scenario of the method for accessing a website according to this embodiment is shown. In the application scenario as shown in FIG. 3, a primary CDN node of Operator A is a single ISP line node. When the primary CDN node receives the access request for the website www.example.com. of Operator B, it is detected that the access request comes from the network of Operator A, and the ISP of the source address of the access request is different from that of the destination address. In such a case, the primary CDN node selects a BGP secondary CDN node from a plurality of preset inter-network nodes to increase the access speed of the website, wherein the BGP secondary CDN node not only connects the network of Operator A but also connects the network of Operator B. Next, after being sent to the selected BGP secondary CDN node, the access request is transmitted to the website by the BGP secondary CDN node.

By dynamically selecting a path, the method provided by the above embodiments of the present disclosure can dynamically select an access path and increase an access speed when accessing a website across an ISP network.

Figure 4:
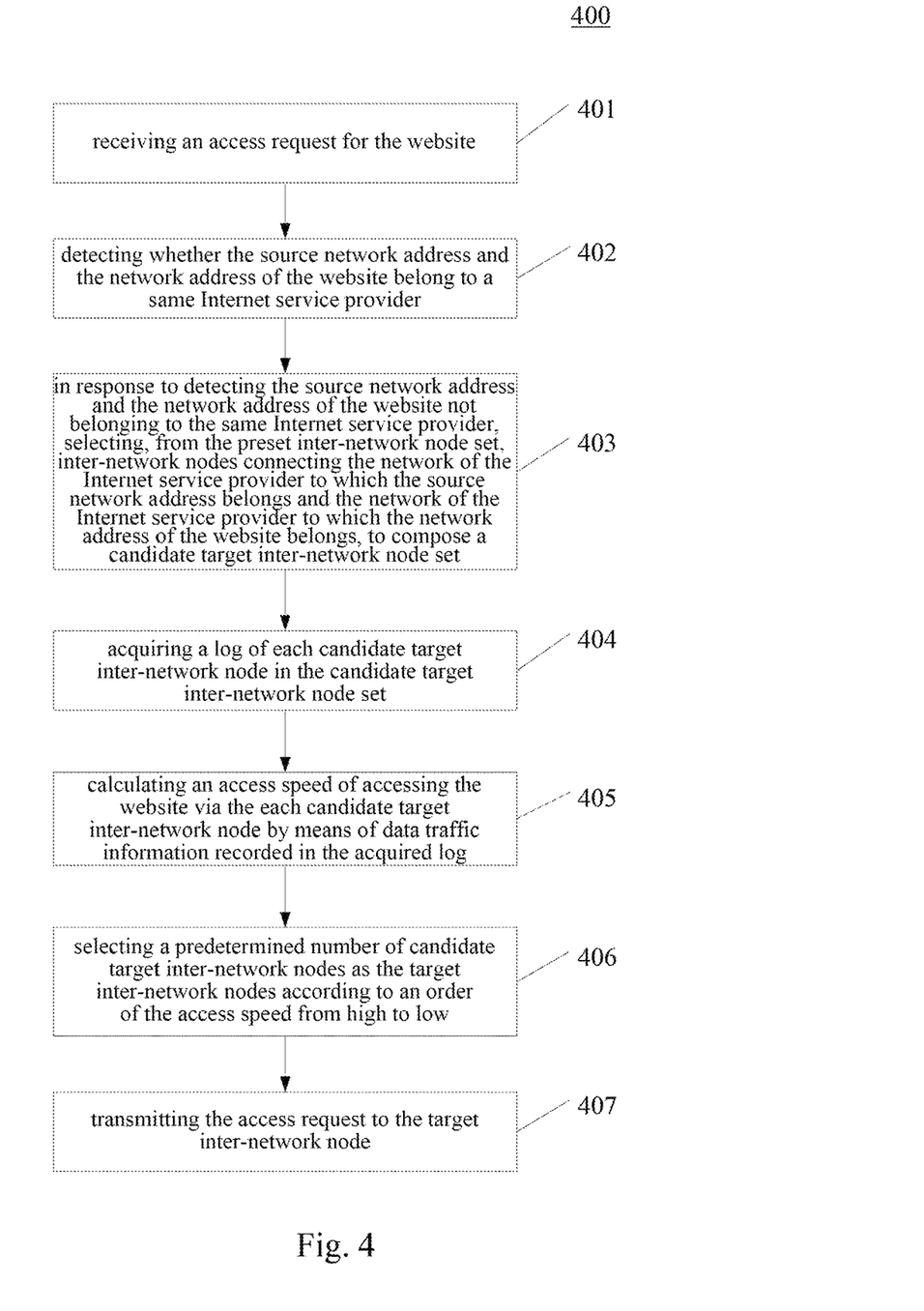
FIG. 4 is a schematic flowchart of a method accessing a website according to another embodiment of the present application.

Further referring to FIG. 4, a flowchart 400 of the method for accessing a website according to still another embodiment is illustrated. The flowchart 400 of the method for accessing a website comprises following steps.

Step 401: receiving an access request for the website.

Step 402: detecting whether the source network address and the network address of the website belong to the same Internet service provider.

Steps 401-402 are basically identical to Steps 201-202, and thus are not repeated.

Step 403: in response to detecting the source network address and the network address of the website not belonging to the same Internet service provider, selecting, from the preset inter-network node set, inter-network nodes connecting the network of the Internet service provider to which the source network address belongs and the network of the Internet service provider to which the network address of the website belongs, to compose a candidate target inter-network node set.

In this embodiment, when the source network address and the network address of the website do not belong to the same Internet service provider, the inter-network nodes connecting the two Internet service providers are found out from the preset inter-network node set to compose the candidate target inter-network node set.

Step 404: acquiring a log of each candidate target inter-network node in the candidate target inter-network node set.

In this embodiment, a log is acquired from each inter-network node of the candidate target inter-network node set by way of wired connection or wireless connection, wherein the log records data information of this node.

Step 405: calculating an access speed of accessing the website via the each candidate target inter-network node by means of data traffic information recorded in the acquired log.

In this embodiment, an access speed of accessing the website is calculated via the each inter-network node by means of data traffic information recorded in the acquired log. For example, the log records data traffic and time information for accessing the website www.example.com. Access speeds of different paths for accessing the website via the each inter-network node may be calculated according to the data traffic and time information.

Step 406: selecting a predetermined number of candidate target inter-network nodes as the target inter-network nodes according to an order of the access speed from high to low.

In this embodiment, based on the access speeds of different paths for accessing the website via the each inter-network node calculated in Step 405, a predetermined number of candidate target inter-network nodes may be selected as the target inter-network nodes according to an order of the access speeds from high to low. The predetermined number may be one or more. In the event that the access speed is equal, the node nearest to the user may be selected.

Step 407: transmitting the access request to the target inter-network node.

Step 407 is basically identical to Step 204, and thus is not repeated.

As can be seen from FIG. 4, compared with the embodiment corresponding to FIG. 2, the flow 400 of the method for accessing a website in this embodiment highlights the step of selecting the target inter-network nodes based on the access speed. Thus, the access speed may be increased according to the scheme as described in this embodiment.

Figure 5:
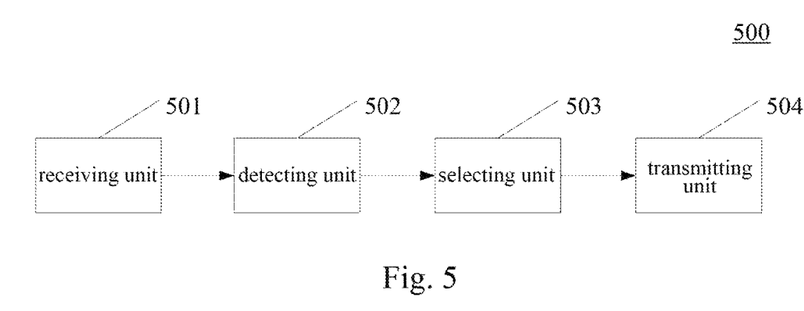
FIG. 5 is a diagram showing the structure of the apparatus for Fig according to an embodiment of the present application.

Further referring to FIG. 5, as an implementation of the method as shown in the foregoing figures, the present disclosure provides an embodiment of an apparatus for accessing a website. The apparatus embodiment corresponds to the method embodiment as shown in FIG. 2, and the apparatus specifically may be used in various electronic devices.

As shown in FIG. 5, the apparatus 500 for accessing a website according to this embodiment comprises: a receiving unit 501, a detecting unit 502, a selecting unit 503 and a transmitting unit 504. The receiving unit 501 is configured to receive an access request for the website, wherein the access request comprises a source network address of the access request and a network address of the website. The detecting unit 502 is configured to detect whether the source network address and the network address of the website belong to the same Internet service provider. The selecting unit 503 is configured to determine a target inter-network node from a preset inter-network node set in response to detecting the source network address and the network address of the website not belonging to the same Internet service provider, wherein the target inter-network node is an inter-network node connecting a network of an Internet service provider to which the source network address belongs and a network of an Internet service provider to which the network address of the website belongs. The transmitting unit 504 is configured to transmit the access request to the target inter-network node.

In this embodiment, the receiving unit 501 transmits the received access request to the detecting unit 502 to determine whether a destination address and a source address of the access request belong to the same ISP. When the destination address and the source address of the access request do not belong to the same ISP, a target inter-network node is selected by the selecting unit 503, and then the access request is transmitted to the target inter-network node by the transmitting unit 504.

In some optional implementations of this embodiment, the selecting unit 503 is further configured to: select, from the preset inter-network node set, inter-network nodes connecting the network of the Internet service provider to which the source network address belongs and the network of the Internet service provider to which the network address of the website belongs, to compose a candidate target inter-network node set; acquire a log of each candidate target inter-network node in the candidate target inter-network node set; calculate an access speed of accessing the website via the each candidate target inter-network node by means of data traffic information recorded in the acquired log; and select a predetermined number of candidate target inter-network nodes as the target inter-network nodes according to an order of the access speed from high to low.

In some optional implementations of this embodiment, the apparatus 500 further comprises a counting unit (not shown), configured to add a counter into an HTTP header of the access request before transmitting the access request to the target inter-network node, wherein an initial value of the counter is associated with the number of nodes through which the access request will pass, and a value of the counter decreases progressively every time one node is passed.

In some optional implementations of this embodiment, the transmitting unit 504 is further configured to transmit the access request to the target inter-network node through Dedicated Internet Access.

In some optional implementations of this embodiment, the transmitting unit 504 is further configured to transmit the access request to the target inter-network node through IP tunneling which is a protocol for interconnecting networks.

In some optional implementations of this embodiment, the preset inter-network node is a Border Gateway Protocol node.

In some optional implementations of this embodiment, the preset inter-network node is a dual-line node of an Internet service provider.

Figure 6:
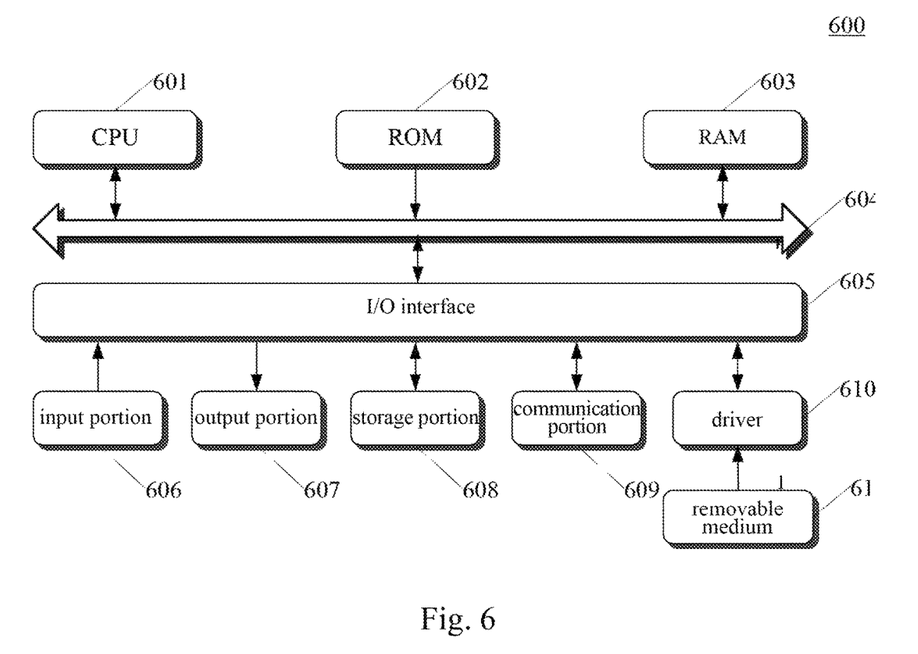
FIG. 6 illustrates a structural schematic diagram of a computer system adapted to implement a server of the embodiments of the present application.

Referring to FIG. 6, a schematic structural diagram of a computer system 600 adapted to implement a server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the CPU 601, implements the functions as defined by the methods of the present disclosure.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising a receiving unit, an detecting unit, a selecting unit and a transmitting unit, where the names of these units or modules do not in some cases constitute a limitation to such units or modules themselves. For example, the receiving unit may also be described as "a unit for receiving an access request for the website."

In another aspect, the present application further provides a non-volatile computer-readable storage medium. The non-volatile computer-readable storage medium may be the non-volatile computer storage medium included in the apparatus in the above described embodiments, or a stand-alone non-volatile computer-readable storage medium not assembled into the apparatus. The non-volatile computer-readable storage medium stores one or more programs. The one or more programs, when executed by a device, cause the device to: receive an access request for the website, the access request comprising a source network address of the access request and a network address of the website; detect whether the source network address and the network address of the website belong to a same Internet service provider; determine a target inter-network node from a preset inter-network node set in response to detecting the source network address and the network address of the website not belonging to the same Internet service provider, the target inter-network node being an inter-network node connecting a network of an Internet service provider to which the source network address belongs and a network of an Internet service provider to which the network address of the website belongs; and transmit the access request to the target inter-network node.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for accessing a web site, comprising:
   receiving an access request for the website, the access request comprising a source network address of the access request and a network address of the website;
   detecting whether the source network address and the network address of the website belong to a same Internet service provider;
   determining a target inter-network node from a preset inter-network node set in response to detecting the source network address and the network address of the website not belonging to the same Internet service provider, the target inter-network node being an inter-network node connecting a network of an Internet service provider to which the source network address belongs and a network of an Internet service provider to which the network address of the website belongs; and
   transmitting the access request to the target inter-network node,
   wherein the determining a target inter-network node from a preset inter-network node set comprises:
   selecting, from the preset inter-network node set, inter-network nodes connecting the network of the Internet service provider to which the source network address belongs and the network of the Internet service provider to which the network address of the website belongs, to compose a candidate target inter-network node set;
   acquiring a log of each candidate target inter-network node in the candidate target inter-network node set
   calculating an access speed of accessing the website via the each candidate target inter-network node by means of data traffic information recorded in the acquired log; and
   selecting a predetermined number of candidate target inter-network nodes as the target inter-network nodes according to an order of the access speed from high to low.

2. The method for accessing a website according to claim 1, wherein before transmitting the access request to the target inter-network node, the method further comprises:
   adding a counter into an HTTP header of the access request, an initial value of the counter being associated with a number of nodes through which the access request will pass, and a value of the counter decreasing progressively every time one node is passed.

3. The method for accessing a website according to claim 1, wherein the transmitting the access request to the target inter-network node comprises:
   transmitting the access request to the target inter-network node through Dedicated Internet Access.

4. The method for accessing a website according to claim 1, wherein the transmitting the access request to the target inter-network node comprises:
   transmitting the access request to the target inter-network node through IP tunneling which is a protocol for interconnecting networks.

5. The method for accessing a website according to claim 1, wherein the preset inter-network node is a Border Gateway Protocol node.

6. The method for accessing a website according to claim 1, wherein the preset inter-network node is a dual-line node of an Internet service provider.

7. A device, comprising:
   a processor; and
   a memory,
   the memory storing computer-readable instructions, which when executed by the processor, cause the processor to perform operations, the operations comprising:
   receiving an access request for the website, the access request comprising a source network address of the access request and a network address of the website;
   detecting whether the source network address and the network address of the website belong to a same Internet service provider;
   determining a target inter-network node from a preset inter-network node set in response to detecting the source network address and the network address of the website not belonging to the same Internet service provider, the target inter-network node being an inter-network node connecting a network of an Internet service provider to which the source network address belongs and a network of an Internet service provider to which the network address of the website belongs; and
   transmitting the access request to the target inter-network node,
   wherein the determining a target inter-network node from a preset inter-network node set comprises:
   selecting, from the preset inter-network node set, inter-network nodes connecting the network of the Internet service provider to which the source network address belongs and the network of the Internet service provider to which the network address of the website belongs, to compose a candidate target inter-network node set;
   acquiring a log of each candidate target inter-network node in the candidate target inter-network node set
   calculating an access speed of accessing the website via the each candidate target inter-network node by means of data traffic information recorded in the acquired log; and
   selecting a predetermined number of candidate target inter-network nodes as the target inter-network nodes according to an order of the access speed from high to low.

8. The device according to claim 7, wherein before transmitting the access request to the target inter-network node, the operations further comprises:
   adding a counter into an HTTP header of the access request, an initial value of the counter being associated with a number of nodes through which the access request will pass, and a value of the counter decreasing progressively every time one node is passed.

9. The device according to claim 7, wherein the transmitting the access request to the target inter-network node comprises:

transmitting the access request to the target inter-network node through Dedicated Internet Access.

10. The device according to claim 7, wherein the transmitting the access request to the target inter-network node comprises:

transmitting the access request to the target inter-network node through IP tunneling which is a protocol for interconnecting networks.

11. The device according to claim 7, wherein the preset inter-network node is a Border Gateway Protocol node.

12. The device according to claim 7, wherein the preset inter-network node is a dual-line node of an Internet service provider.

13. A non-transitory computer storage medium, storing computer-readable instructions, which when executed by a processor, cause the processor to perform operations, the operations comprising:

receiving an access request for the website, the access request comprising a source network address of the access request and a network address of the website;

detecting whether the source network address and the network address of the website belong to a same Internet service provider;

determining a target inter-network node from a preset inter-network node set in response to detecting the source network address and the network address of the website not belonging to the same Internet service provider, the target inter-network node being an inter-network node connecting a network of an Internet service provider to which the source network address belongs and a network of an Internet service provider to which the network address of the website belongs; and transmitting the access request to the target inter-network node, wherein the determining a target inter-network node from a preset inter-network node set comprises:

selecting, from the preset inter-network node set, inter-network nodes connecting the network of the Internet service provider to which the source network address belongs and the network of the Internet service provider to which the network address of the website belongs, to compose a candidate target inter-network node set;

acquiring a log of each candidate target inter-network node in the candidate target inter-network node set;

calculating an access speed of accessing the website via the each candidate target inter-network node by means of data traffic information recorded in the acquired log; and selecting a predetermined number of candidate target inter-network nodes as the target inter-network nodes according to an order of the access speed from high to low.

14. The non-transitory computer storage medium according to claim 13, wherein before transmitting the access request to the target inter-network node, the operations further comprises:

adding a counter into an HTTP header of the access request, an initial value of the counter being associated with a number of nodes through which the access request will pass, and a value of the counter decreasing progressively every time one node is passed.

15. The non-transitory computer storage medium according to claim 13, wherein the transmitting the access request to the target inter-network node comprises:

transmitting the access request to the target inter-network node through Dedicated Internet Access.

16. The non-transitory computer storage medium according to claim 13, wherein the transmitting the access request to the target inter-network node comprises:

transmitting the access request to the target inter-network node through IP tunneling which is a protocol for interconnecting networks.

17. The non-transitory computer storage medium according to claim 13, wherein the preset inter-network node is a Border Gateway Protocol node.

18. The non-transitory computer storage medium according to claim 13, wherein the preset inter-network node is a dual-line node of an Internet service provider.

* * * * *